UNITED STATES PATENT OFFICE 2,616,929

PROCESS OF MANUFACTURING CHLORAL

Jacob Rosin, New York, N. Y., assignor to Montrose Chemical Company, Newark, N. J., a corporation of New Jersey No Drawing. Application September 4, 1947, Serial No. 772,221

2 Claims. (Cl. 260—601)

My present invention relates to the manufacture of chloral by the chlorination of ethyl alcohol.

It is a principal object of my invention materially to increase the yield of chloral by such process. In addition to its higher yield, my improved process permits greater capacity to be had from the same or equivalent equipment heretofore used.

In addition to its many older uses, chloral is now one of the starting materials in the manufacture of DDT (1,1,1-trichloro-2,2-bis (p-chlorophenyl) ethane).

The method now in general use, which is essentially the textbook method for making chloral, consists principally in introducing chlorine into ethyl alcohol until the specific gravity of the mixture reaches a value between 1.50 and 1.60 at 20° C. after which the reaction products are mixed with sulphuric acid and distilled or the chloral layer in the vessel is separated, as by decanting and used directly in the manufacture of DDT for its chloral content. If the mixture is distilled with sulphuric acid the distillate may be used directly or it may be purified by further fractional distillation or by other known methods.

The mechanism in the liquid phase chlorination of alcohol is not very clear, various explanations having been advanced. But as final result a mixture containing mostly chloral alcoholate is formed, so that the reaction can be summarized as follows:

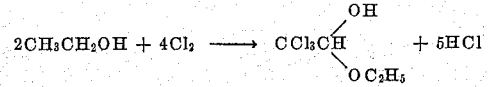

In practice an excess of chlorine is used which, however, does not convert the alcohol content of the chloral alcoholate to chloral but rather to ethyl chloride and other undesirable products from the point of view of chloral manufacture. Thus the maximum theoretical yield obtainable is one mole of chloral for two moles of alcohol or 10.5 lbs. chloral per gallon of ethyl alcohol. Of course, in actual practice, owing to undesirable side reactions and physical and mechanical losses, this theoretical yield is never obtained, actual yields based on alcohol being 9 lbs. of chloral per gallon of alcohol which is 85% of the above theory, assuming two moles of alcohol to be required for one mole of chloral.

The older literature specifies the use of absolute alcohol for the production of chloral although many producers use ordinary 95% alcohol. However, it is generally accepted in the art that the presence of water in excess of that required to form 95% alcohol by volume produces lower yields of chloral and is to be avoided.

Contrary to this accepted theory and practice I have found that as described herein the addition of water to the reaction in proper amounts is highly beneficial. Further, I have found that for the highest yields at least the major portion of the water should be added after the reaction has proceeded to a certain point, although a substantial increase in yield as compared to the classic method will be had even if all the water be added initially. In brief, the presence of a sufficient amount of water changes the mechanism of the reaction transforming it from a reaction conducted in an organic medium into one conducted in an aqueous medium so that in theory only one mole of alcohol is required to produce one mole of chloral.

In actual practice the yields obtained are in excess of 70% of this theory, i. e., assuming one mole of alcohol to be theoretically required to produce one mole of chloral. Expressed in other units, a gallon of alcohol will thus yield 15 lbs. of chloral or over 60% more than is obtained by the classic method.

I have found that in the classic method of chlorinating alcohol, the absorption of chlorine proceeds very rapidly until a specific gravity at 25° C. of 1.33 plus or minus .05 is reached. I found this point to correspond to the point of substantially complete formation of dichloroacetaldehyde alcoholate

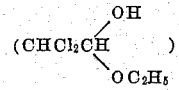

as evidenced first by the amount of chlorine absorbed, second by the amount of hydrochloric acid given off, third by the increase in weight of the chlorinated alcohol and fourth by the actual isolation of dichloroacetaldehyde by distillation with sulfuric acid, all of which quantities I have found to correspond for all practical purposes with those theoretically required for the formation of the said dichloroacetaldehyde alcoholate. From this point on in the classic method of operation, the absorption of chlorine proceeds very slowly and large excesses of chlorine are necessary for the maximum yield of chloral. It is common to consider the chlorination complete when a specific gravity of 1.50 to 1.60 at 20° C. is reached. The end products consist of a mixture of chloral alcoholate

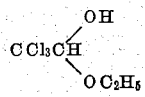

chloral CCl₃CHO, chloral hydrate

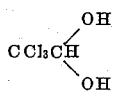

and chloral diethylacetal

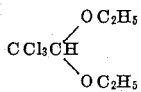

which are further treated as already described.

If now at the point in the classic method above described where a gravity of 1.33 plus or minus .05 at 25° C. is reached, the proper amount of water is added, the mechanism of the reaction is changed with the results stated. In accordance with an explanation which I believe to be correct the water which is added at this point in sufficient amounts performs two functions: 1) it acts as a solvent and dielectric thus facilitating further chlorination, 2) it partially hydrolyzes dichloroacetaldehyde alcoholate and subsequently chloral alcoholate which are formed into their respective hydrates and alcohol, which is thus released for further chlorination. This latter proceeds smoothly and rapidly to the formation of a major portion of chloral hydrate which sometimes contains small quantities of chloral alcoholate and chloral diethylacetal. If desired, the chloral may be separated in any convenient known way or the crude chloral mixture may be used directly in the manufacture of DDT, or the reaction mixture may be distilled with sulphuric acid to give chloral in excess of 70% of the theory as above pointed out.

In general the amount of water added should be somewhat greater than that stoichiometrically required for the formation of the chloral hydrate and I have found in practice that this quantity should vary between somewhat in excess of 1 and not in excess of 3 moles per mole of alcohol started with, preference being had for the quantity of 2 moles of water per mole of alcohol. It will be understood that the addition of water in excess of 3 moles per mole of alcohol started with merely dilutes the reacting products and thereby causes a reduction of the yield. Similarly if an amount of water is added which is less than 1 mole per mole of alcohol, the chlorination is found to be incomplete.

My invention will be further explained by the following illustrative example:

206 cc. of 95½% (by volume) alcohol (3.37 moles) is placed in a suitable vessel provided with reflux condenser and means of introducing chlorine gas. The chlorine is introduced as rapidly as it is absorbed as evidenced by the practical absence of chorine in the exit gases. The evolved hydrochloric acid gas is absorbed in a suitable trap.

The temperature soon approaches the boiling point of the mixture and the rate of addition of chlorine will depend to some extent on the efficiency of the reflux condenser as care should be exercised not to exceed its capacity to return condensible vapors to the chlorinating vessel. Given a rate of 3½ grams of chlorine per minute, in about 2½ hours the chlorination mixture will have increased so as to weigh from 260 to 280 grams. The specific gravity will be between 1.29 and 1.35 at 25° C., the HCl traps by weight or titration will show an increase of about 245 grams of HCl gas (equivalent to two moles per mole of alcohol). All such data correspond to the point where the alcohol has been chlorinated to yield a maximum of dichloroacetaldehyde alcoholate.

Now 120 cc. of water are added and the introduction of chlorine is continued at the rate of 2.5 gms. per minute for about 8 hours. During this stage the chlorinating vessel should be heated by any suitable means to reach and maintain the boiling temperature of the mixture, which averages about 95° C. Chlorinating below the boiling points slows down the rate of chlorination; chlorination under pressure which raises the boiling points, increases the rate of chlorination. At the end of this period the weight of the chlorination mixture should be between 500 and 550 gms. and its specific gravity should be between 1.50 and 1.57 at 25° C.

For practical purposes the chlorination may now be considered completed and if free chloral is desired the product is treated in the usual manner, that is, the mixture is mixed with an approximately equal volume of concentrated sulphuric acid and distilled to yield about 362 grams of chloral, equivalent to 73% of the theory based on one mole of alcohol to yield one mole of chloral. When the 120 cc. of water was added at the start of the chlorination instead of at the point mentioned in the above example the yield was 60% of this theory. In explanation it may be pointed out that the formation of dichloroacetaldehyde alcoholate is not facilitated, though not prevented entirely by having not in excess of a slight amount of water present.

Various departures from the specific example given will occur to those skilled in the art, without, however, departing from the spirit of my invention. For example, absolute alcohol may be started with, although no substantial advantage has been found to occur from its use.

I claim:

1. In the method of making chloral by the liquid phase chlorination of ethyl alcohol in which chlorine is passed into alcohol of not substantially less than 190° proof, the steps which consist in adding water to the reacting mixture formed by the passing of said chlorine into said alcohol at the point where the formation of dichloro-acetaldehyde alcoholate is substantially completed and before any substantial amount of chloral alcoholate is formed, as is evidenced by the specific gravity of the reacting mixture being substantially 1.33 as of 25° C., the amount of water added being substantially two mols per mol of alcohol started with and continuing the chlorination at temperatures not substantially lower than the boiling point of the mixture until the formation of chloral hydrate is substantially complete.

2. The method according to claim 1 in which chloral is recovered by distillation of the reaction products with sulphuric acid.

JACOB ROSIN.

REFERENCES CITED

The following references are of record in the file of this patent:

UNITED STATES PATENTS

| Number | Name | Date |
| --- | --- | --- |
| 2,478,741 | Brothman | Aug. 9, 1949 |

OTHER REFERENCES

Callaham, Chem. & Met. vol. 51 (October 1944), pages 109 to 114.